Dec. 13, 1960 — J. F. ENGLER — 2,963,844
MOWER BLADE
Filed April 20, 1959 — 2 Sheets-Sheet 1
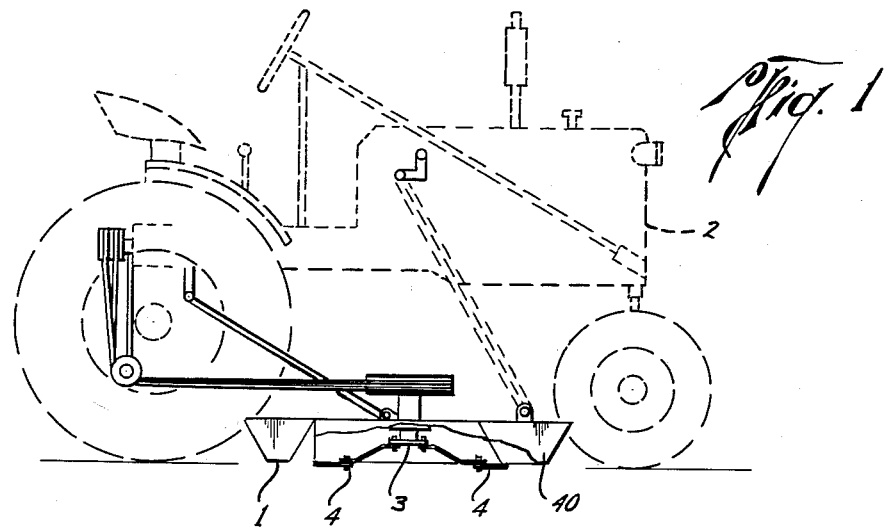
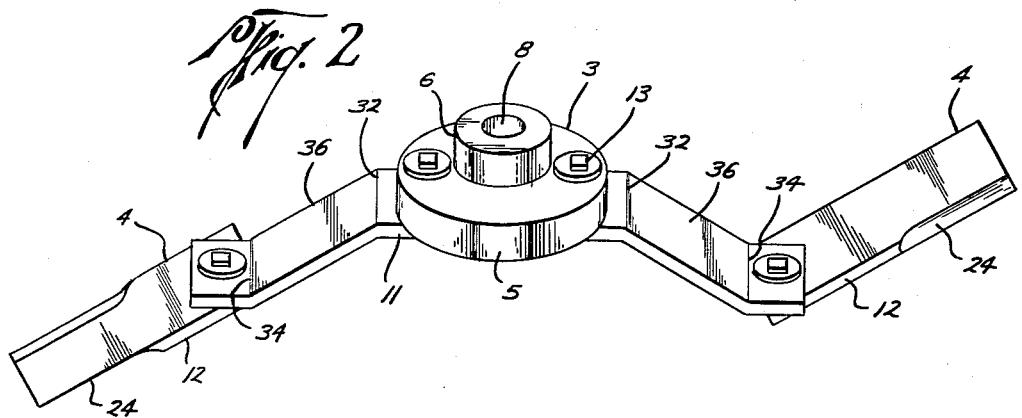
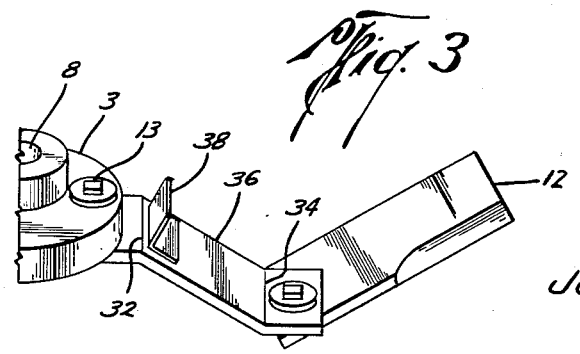
John F. Engler
INVENTOR.
BY
ATTORNEY Dec. 13, 1960   J. F. ENGLER   2,963,844
MOWER BLADE
Filed April 20, 1959   2 Sheets-Sheet 2
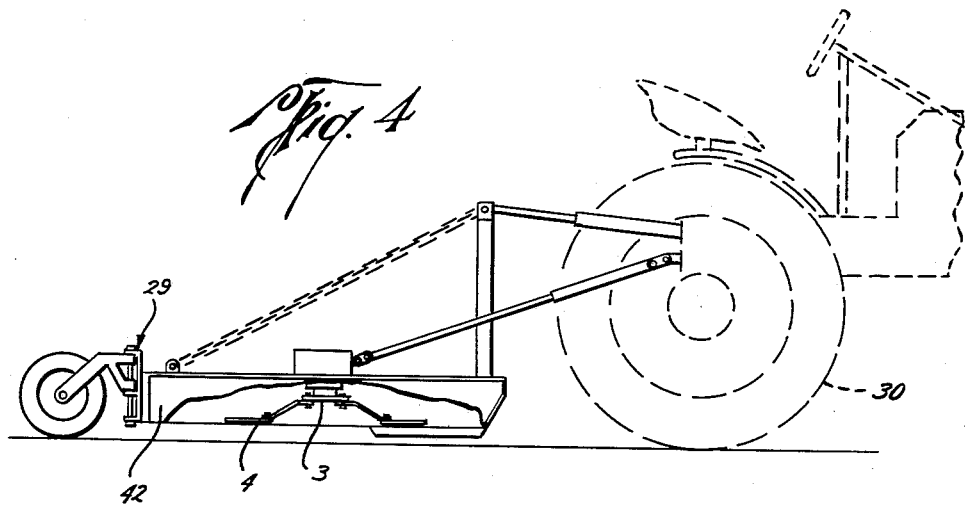
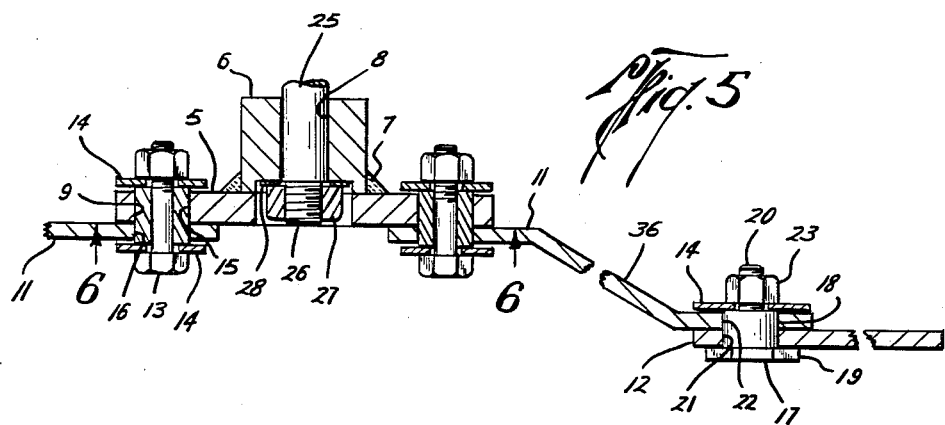
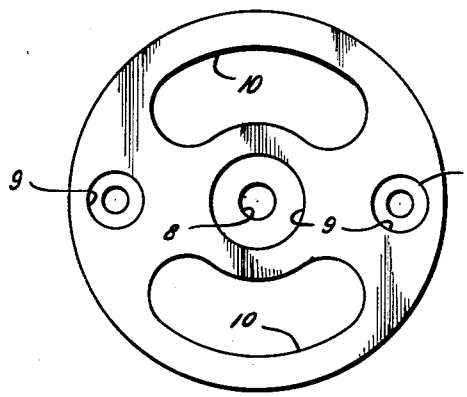
John F. Engler
INVENTOR.
BY
ATTORNEY 2,963,844
                        Patented Dec. 13, 1960

2,963,844

MOWER BLADE

John F. Engler, 4408 Center St., Houston, Tex.

Filed Apr. 20, 1959, Ser. No. 807,528

12 Claims. (Cl. 56—295)

This invention pertains to mowing devices and particularly to a novel shock-absorbing blade hub and blades for use in mowing devices.

An object of this invention is to provide a blade hub and blades in mowing devices which will deflect and absorb shock caused when the blade hub or blades strike hard objects.

Another object of this invention is to provide a blade hub and blades in mowing devices which will eliminate the need for shear pins, slip clutches, and other safety devices to prevent breakage of the blade hub, blades, drive shaft, and drive mechanism.

Another object of this invention is to provide a blade hub and blades for mowing devices in which the blades are double swinging, that is, the blades have two serially-mounted swinging blade sections attached to the blade hub.

Another object of this invention is to provide a blade hub and blades for mowing devices in which the rotatable blade hub is circular so that when the blade hub strikes a hard object the resultant shock will be rotationally diverted to protect the remainder of the apparatus.

Still another object is to provide a blade hub and blades which are double-swinging, and which cannot become locked in an unbalanced position.

The blade hub and blades for mowing devices presented by this invention have a number of practical advantages. With their use it is no longer necessary to protect the drive mechanism of the mowing device with shear pins, safety clutches, and other protective apparatus. The blade hub of this invention is designed to divert shocks from the drive mechanism while rotating. The blades are double-pivoted, one pivot being at the hub, so that should the tip of a blade strike a hard object, the shock is very much reduced at the hub and drive mechanism so that no damage will result even though none of the protective devices is provided. In addition, the cutting blade of this invention is double-edged and can be reversed to give double life and service. Furthermore, the blade holder is so shaped that the blades cannot become jammed together or against the blade holder after striking an unyielding object, but are kept free to swing out by centrifugal force so as to maintain dynamic balance of the mowing device.

Other objects, uses, advantages, and improvements will be apparent from the specification, claims, and drawings, of which:

Figure 1 shows a side elevational partially cut-away view of a mowing device embodying the invention, the mowing device shown supported beneath a tractor;

Figure 2 shows an enlarged top perspective view of a preferred embodiment of the blade hub and blades;

Figure 3 shows an enlarged top perspective view of another embodiment of the blade hub and blades;

Figure 4 shows a side elevational partially cut-away view of another mowing device embodying the invention, the mowing device shown supported behind a tractor;

Figure 5 shows an enlarged partial vertical cross-sectional view of the blade hub and blades; and, Figure 6 shows a bottom view of the hub, taken at line 6—6 of Figure 5.

Referring now in detail to the drawings, Figure 1 shows the novel blade hub and blades embodied in a mowing device which is adapted to be supported beneath a tractor. The mowing device 1 is supported beneath a tractor 2, suitable connective apparatus being provided on the mowing device and tractor. A hub 3 carries a pair of identical blades 4, the hub and blades being mounted conventionally underneath the mowing device 1 such that when the hub and blades are rotated in a substantially horizontal plane, the blades will cut or mow vegetation through or over which the mowing device 1 is carried. A cover 40 extends circuferentially around hub 3 and blades 4.

Referring now to Figures 2, 4, 5 and 6, the blade hub 3 at its lower portion 5 is in the form of a flat circular disc. The upper portion 6 of hub 3, the shaft-connecting portion, is also circular and of smaller diameter than lower portion 5, and has its lower part blended into the upper surface of lower portion 5, for example, by a weld, as shown at 7. Portions 5 and 6 are concentric and an axial shaft bore 8 having an enlarged nut-recess portion 9 at its lower end is provided through hub 3 whereby hub 3 may be connected to a drive shaft. Hub portion 5 has two oppositely disposed bolt holes 9 for connecting the blades 4 to the hub, and at either side between bolt holes 9 are two bottom cut-out sections 10 provided to reduce the weight of the hub. Each of the two blades 4 has an inner section 11 and an outer cutting section 12. At the inner end of each inner blade section 11 is a bolt hole 16 corresponding with one of the bolt holes 9 in the hub, the blade sections 11 being beneath the edge of hub 3. A bushing 15 is received through each bolt hole 9 and bolt hole 16, and is slightly longer than the combined thicknesses of hub portion 5 and inner blade section 11. A bolt 13 having a pair of washers 14 at the head and nut ends thereof, is received through each bushing 15, the bolts 13 and washers 14 coacting to secure the inner blade sections 11 beneath the edge of hub 3. The length of bushings 15 being longer than the combined thicknesses of hub portion 5 and inner blade section 11, each inner blade section when so connected to the hub is free to swing about the bushing. The purpose of this free-swinging connection will be described later.

Inner blade section 11 is bent downwardly at 32 and horizontally at 34 to form an intermediate downwardly and outwardly extending portion 36. In the modification shown in Figure 3, a stop member 38 is affixed to portion 36, and extends upwardly above the top of the inner horizontal portion of blade section 11, so as to prevent blade section 11 from swinging to a position under the hub.

At the outer end of each inner blade section 11 an outer blade section 12 is pivotally and swingingly attached. A special bolt 17 having a shoulder 18, head flange 19, and threaded portion 20, passes upwardly through a hole 21 in the outer blade section 12 and a hole 22 in the inner blade section 11. A nut 23 is screwed onto threaded bolt portion 20 above a washer 14. The bolt shoulder 18 is axially longer than the combined thicknesses of the inner and outer blade sections so that a free-swinging connection results.

The outer blade sections 12 have bevelled sharp-edge portions 24 at each of their sides, and may be inverted so that either of the cutting edges may be used. The outer blade sections are formed as rectangular flat plates having a bolt hole 21 therethrough near one end and having a part of each edge bevelled to form a sharp cutting edge 24. The edges are bevelled in such a manner that when the blade section is inverted the positions of the cutting edges are interchanged. That is, the bottom of one edge is bevelled and the top of the other edge is bevelled. Preferably, the disposition of the cutting edges is so related to the direction of rotation of the hub and blades that the cutting edge bevelled at the top is used for cutting while the edge bevelled at the bottom trails.

The hub 3 is positioned with portion 6 above portion 5 thereof and a shaft 25 having threaded portion 26 at its lower end is received through bore 8. A washer 28 and nut 27 secure the hub 3 onto shaft 25.

Figure 4 of the drawings shows the blade hub and blades of this invention in a mowing device adapted to be drawn by a tractor. The mowing device 29 in this case is wheel mounted and attached to a tractor 30 to be drawn thereby. The hub 3 and blades 4 are in mowing position beneath mowing device 29 as before, a cover 42 extending circumferentially around them.

When the mowing device is in operation, a drive mechanism rotates the shaft which in turn rotates the blade hub 3 and blades 4. The rotation causes the inner and outer blade sections 11 and 12 to swing to substantially radially extended positions at either side of hub 3. The centrifugal force on the blades resulting from their rotation acts to maintain the blades thus radially extended except when another force deflects the blades from this position. The deflection of the blades caused by the cutting of vegetation by the blades is relatively slight unless the vegetation is extraordinarily dense or heavy, in which case the deflection will be increased. Should the blades strike a harder or heavier object than ordinary vegetation, the blades will be further deflected from their normal positions and will swing about their pivotal connections and away from the object struck, thereby relieving the remainder of the apparatus from strain.

Downwardly and outwardly extending portions 36 of blade member 11 are provided for several purposes. A primary advantage is a reduction in the power required to drive the mower, since most of blade section 11 does not drag on the stubble remaining after blade section 12 has cut the vegetation. An additional advantage is that the treatment of the cut vegetation can be regulated simply by varying the amount of bending of blade section 11. For example, when the blade sections are bent so that blade sections 12 lie on a level with or slightly below cover 40, as shown in Figure 1, the mowing device functions as a forage harvester or haying machine, since the cuttings are expelled under the edge of the cover. On the other hand, when blade sections 11 are bent so that blade sections 12 lie within cover 42, as shown in Figure 4, the cuttings are kept inside the cover until they are chopped into small pieces, as is desirable for mulching.

Still another advantage of the blade of this invention is that there is little tendency for the blades to become jammed or wedged when blade sections 11 and 12 are swung inwardly. Blade section 12 is positioned below the rest of the blade and the hub so that it can swing freely 360°. In the modification shown in Figure 3, stop member 38 prevents blade section 11 from swinging under hub 3 and becoming wedged or jammed there. This is accomplished by contact of stop member 38 against the edge of hub 3 when the blade section 11 is swung about bolt 13 and bushing 15.

The use of the blade hub and blades of this invention is not limited to the types of mowing devices shown in describing this preferred embodiment of the invention. They may be used in any other type of "rotary" mowing device as well.

In operation, the hub and blades of this invention are far superior to those previously developed and used in other mowing devices. A principal advantage is the ability of the hub and blades to endure shocks resulting from the striking of objects on the ground being moved. In addition, the hub and blades function as a shock-absorbing medium to protect the drive mechanism and the shaft to which the drive mechanism and hub are connected, eliminating any need for shear pins, safety clutches, and other protective apparatus in the mowing devices in which the hub and blades are incorporated. When the hub strikes an object on the ground, the rounded outer contour of the hub causes the shock to be displaced in the rotational direction that the hub is moving so that only a very small fraction of the original shock is felt at the shaft. The remainder of the shock is rotationally dissipated because of the rotation of the hub and shaft. Should the blades strike an object on the ground, their double-pivoted construction permits them to swing away from the object and absorb any shock. The fact that these blades are pivoted at their connection with the hub as well as having the conventional pivot connections at the inner ends of the cutting portions of the blades, makes their shock-absorbing characteristics superior over other mower blades. A shock imposed on an outer blade section is dissipated at two free-swinging pivot points so that only a small fraction of the shock reaches the shaft and drive mechanism. A shock imposed on an inner blade section is reduced by the free-swinging pivot connection at the hub, rather than being directly transmitted to the hub as is the case with conventional mowing devices in which the hub and inner blade section are rigidly connected.

The outer blade sections can swing in a complete circle about bolts 17 without danger of becoming wedged. This is particularly important, since jamming of one blade section at any position other than its radially extended position, during operation, would result in dynamic unbalance of the mowing device, which in turn would cause such vibrations as to severely damage the mowing device and its driving mechanism. In modification shown in Figure 3, stop members 38 also prevent jamming of blade sections 11 under the hub, with a similar beneficial result.

Many modifications of the invention may be made by a person skilled in the art without departing from the spirit thereof, and the scope of the invention is not intended to be limited by the embodiments thereof shown and described, but only according to the scope of the following claims.

I claim:

1. In a mowing device, a shock-absorbing blade hub and blade assembly comprising a rotatable hub, a mounting shaft therefor, a plurality of blades attached thereto, a pivotal connection attaching each of said blades to said hub for pivotal movement relative to said hub, each of said blades comprising an inner section and an outer section, a pivotal connection between said inner section and said outer section, the axes of said shaft and said pivotal connections being substantially parallel to each other, and one of said sections of each of said blades having a portion extending downwardly and outwardly.

2. The combination of claim 1, wherein said pivotal connection between said inner section and said outer section permits a 360° pivot of said outer section of each of said blades about the said pivotal connections in a substantially horizontal plane.

3. The combination of claim 1, including means preventing 360° pivoting of said inner section of each of said blades in a substantially horizontal plane.

4. The combination of claim 3, wherein said pivotal connection between said inner section and said outer section permits a 360° pivot of said outer section of each of said blades in a substantially horizontal plane.

5. In a mowing device, a shock-absorbing blade hub and blade assembly comprising a rotatable hub, a substantially vertical mounting shaft upon which said hub is mounted for rotation therewith in a substantially horizontal plane, a plurality of blades extending outwardly and downwardly from said hub, each blade having an outer end and an inner end, pivot means connecting each of said blades to said hub adapted to permit substantially horizontal pivoting of each of said blades about said hub, and pivot means intermediate the ends of each of said blades adapted to permit substantially horizontal pivoting of the outer end of the blade with respect to the inner end of the blade, the axes of each of said pivot means and said mounting shaft being substantially parallel to each other.

6. The combination of claim 5, wherein said means intermediate the ends of each of said blades permit 360° pivoting of the outer end of the blade with respect to the inner end of the blade.

7. The combination of claim 5, including means on said blade preventing 360° pivoting of the inner end of the blade about said hub.

8. The combination of claim 7, wherein said means intermediate the ends of each of said blades permit 360° pivoting of the outer end of the blade with respect to the inner end of the blade.

9. In a mowing device, a shock-absorbing blade hub and blade assembly comprising a rotatable hub, a vertical drive shaft therefor, a vertical central bore in said hub for rigidly attaching said hub to said vertical drive shaft, a plurality of axially extending pivot pins on said hub and radially displaced from the center of said hub, an inner blade section pivotally mounted on each of said pivot pins, whereby said inner blade sections are free to pivot with respect to said hub in a substantially horizontal plane, each said inner blade section having an inner portion extending outwardly and substantially horizontally from said hub, an intermediate portion extending outwardly and downwardly from the outer end of said inner portion, and an outer portion extending outwardly and substantially horizontally from the outer end of said intermediate portion, a stop member on said inner blade section adapted to contact said hub upon pivoting of said inner blade section, an axially extending pivot pin on said outer portion of said inner blade section, an outer blade section pivotally mounted on said pivot pin, whereby said outer blade section is free to pivot with respect to said inner blade section in a substantially horizontal plane, the axes of each of said pivot pins and said drive shaft being substantially parallel to each other.

10. In a mowing device, a shock absorbing hub and blade assembly comprising a rotatable hub, a vertical drive shaft on which said hub is mounted for rotation therewith in a substantially horizontal plane, a plurality of inner blade sections each having an inner portion extending outwardly and substantially horizontally, an intermediate portion extending outwardly and downwardly from said inner portion, and a relatively short outer portion extending outwardly and substantially horizontally from said intermediate portion, means pivotally attaching said inner portion to said hub for pivotal movement relative thereto in a substantially horizontal plane, an outer blade section attached at its inner end to the outer portion of each of said inner blade sections, means pivotally attaching said outer blade section to said outer portion of said inner blade section for pivotal movement relative thereto in a substantially horizontal plane, and a cutting edge on one edge of each of said outer blade sections, the length of the outer portion of each said inner blade sections being substantially less than the length of the outer blade section attached thereto.

11. A mowing device as defined by claim 10 wherein the outer blade section is positioned at a level below the inner blade section, whereby the outer blade section is free to pivot 360° in a substantially horizontal plane below the inner blade section without danger of jamming.

12. In a mowing device, a shock-absorbing blade hub and blade assembly comprising a roatable hub, a vertical drive shaft on which said hub is mounted for rotation therewith in a substantially horizontal plane, a plurality of inner blade sections attached to said hub, pivot means attaching each said inner blade section to said hub for horizontal swinging movement relative thereto, an outer blade section attached to the bottom of each said inner blade section, pivot means attaching said outer blade sections to said inner blade sections for horizontal swinging movement relative thereto, and a downwardly and outwardly extending portion in each said inner blade section, whereby said outer blade sections are pivotable in a plane displaced below the plane of pivoting of said inner blade section, whereby said outer blade sections cannot become jammed upon swinging past said inner blade sections, the axes of each of said pivot means and said drive shaft being substantially parallel to each other.

References Cited in the file of this patent

UNITED STATES PATENTS

| | | |
|---|---|---|
| 2,654,986 | Gold | Oct. 13, 1953 |
| 2,691,262 | Swertfeger | Oct. 12, 1954 |
| 2,743,567 | Martin | May 1, 1956 |
| 2,891,369 | Rietz | June 23, 1959 |

FOREIGN PATENTS

| | | |
|---|---|---|
| 416,140 | Great Britain | Sept. 13, 1934 |